United States Patent
Thompson (10) Patent No.: US 8,279,768 B2
(45) Date of Patent: Oct. 2, 2012

(54) METHODS, DEVICES AND COMPUTER PROGRAM PRODUCTS FOR CAPTURING EVENTS ASSOCIATED NETWORK ANOMALIES

(75) Inventor: James Gordon Thompson, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 340 days.

(21) Appl. No.: 12/115,079

(22) Filed: May 5, 2008

(65) Prior Publication Data

US 2009/0274053 A1  Nov. 5, 2009

(51) Int. Cl.
*H04L 12/26* (2006.01)

(52) U.S. Cl. .......................... 370/252; 370/400; 370/503

(58) Field of Classification Search ................... 370/252, 370/400, 503
See application file for complete search history.

(56) References Cited

U.S. PATENT DOCUMENTS

| | | | |
|---|---|---|---|
| 5,682,328 A * | 10/1997 | Roeber et al. | 702/187 |
| 6,205,362 B1 * | 3/2001 | Eidson | 700/4 |
| 6,810,244 B2 * | 10/2004 | Bristow et al. | 455/418 |
| 7,336,958 B2 * | 2/2008 | Kawasaki et al. | 455/450 |
| 2002/0059078 A1 * | 5/2002 | Valdes et al. | 705/1 |
| 2002/0071530 A1 * | 6/2002 | Hannigan | 379/88.19 |
| 2004/0201685 A1 * | 10/2004 | Seaman et al. | 348/207.1 |
| 2005/0193429 A1 * | 9/2005 | Demopoulos et al. | 726/23 |
| 2007/0234426 A1 * | 10/2007 | Khanolkar et al. | 726/23 |
| 2008/0136605 A1 * | 6/2008 | Hunt et al. | 340/286.02 |
| 2008/0218382 A1 * | 9/2008 | Kavaler | 340/933 |
| 2009/0001226 A1 * | 1/2009 | Haygood | 246/169 S |
| 2010/0058165 A1 * | 3/2010 | Bhattacharya et al. | 715/227 |
| 2010/0268819 A1 * | 10/2010 | Mahajan et al. | 709/224 |
| 2012/0046982 A1 * | 2/2012 | Wellman | 705/7.12 |

* cited by examiner

*Primary Examiner* — Jason Mattis
(74) *Attorney, Agent, or Firm* — Myers Bigel Sibley & Sajovec, P.A.

(57) ABSTRACT

Methods, devices and computer program products are provided for capturing information associated with a triggering event at a network-enabled device. A triggering event is detected at a first network-enabled device. A message is transmitted to at least one other network-enabled device responsive to the detected triggering event. The message includes an indication of a time period associated with the triggering event and a request that the at least one other network-enabled device mark information associated with the at least one other network-enabled device during the associated time period as having significance, such that this information is retained rather than discarded.

22 Claims, 5 Drawing Sheets

METHODS, DEVICES AND COMPUTER PROGRAM PRODUCTS FOR CAPTURING EVENTS ASSOCIATED NETWORK ANOMALIES

BACKGROUND OF THE INVENTION

The present invention relates generally to network-enabled devices, and more particularly, information associated with events in the network-enabled devices.

With an increased reliance on electronic devices and electronic methods of communication, more and more devices are being configured to connect to communications networks, i.e. many devices are network-enabled. For example, many power distribution devices, such as, uninterruptible power supplies (UPSs), are configured to connect to a communications network. Other devices, such as meters and feeder protectors may also be connected to the communications network.

Typically, these devices are continually buffering information and scanning this information for transients, anomalies, deviations from normal functionality. When one of these devices detects such an event, the device experiencing the event stores information associated with the event so as to allow a cause of the event to be determined. This information may be stored in a file associated with the device. A user or device administrator may obtain the information by, for example, browsing the device using an appropriate web browser. Some devices may even be configured to email the information to the user.

SUMMARY OF THE INVENTION

Some embodiments of the present invention provide methods, devices and computer program products for capturing information associated with a triggering event at a network-enabled device. A triggering event is detected at a first network-enabled device. A message is transmitted to at least one other network-enabled device responsive to the detected triggering event. The message includes an indication of a time period associated with the triggering event and a request that the at least one other network-enabled device mark information associated with the at least one other network-enabled device during the associated time period as having significance.

In further embodiments of the present invention, the indication of a time period may include a timing signal indicating the time period associated with the triggering event. In certain embodiments, the timing signal comprises a nearest second at which the triggering event occurred at the first network-enabled device and a number of microseconds from the nearest second at which the triggering event occurred.

In still further embodiments of the present invention, it may be determined at the at least one other network-enabled device if the at least one other network-enabled device has information that pertains to the time period. The information pertaining to the time period may be marked at the at least one other network-enabled device as having significance if determined to be present, such that the marked information is not discarded.

In some embodiments of the present invention, the marked information may include an associated tag indicating an identity of the first network-enabled device.

In further embodiments of the present invention, the message may be broadcast to all other network-enabled devices or transmitted to a select group of network-enabled devices.

In still further embodiments of the present invention, the information marked at the at least one other network-enabled device may include monitoring parameters and/or telemetry data associated with the at least one other network-enabled device during the time period in the message.

In some embodiments of the present invention, the triggering event may include a detected deviation from normal functionality.

Further embodiments of the present invention provide methods, devices and computer program products for capturing information associated with a triggering event at a network-enabled device. A message is received at least one network-enabled device from a requesting device. The message includes an indication of a time period associated with a triggering event and a request that the at least one network-enabled device mark information associated with the at least one network-enabled device during the associated time period. It is determined at the at least one network-enabled device if the at least one network-enabled device has information that pertains to the time period. The information pertaining to the time period at the at least one network-enabled device is marked as having significance if determined to be present.

DETAILED DESCRIPTION OF EMBODIMENTS OF THE INVENTION

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the invention may be embodied as a method, device, or computer program product. Accordingly, the present invention may take the form of an entirely hardware embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to a flowchart illustration and/or block diagrams of methods, devices and computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be described with respect to FIGS. 1 through 6. As discussed herein, embodiments of the present invention provide methods, devices and computer program products for capturing information associated with a triggering event at a network-enabled device. In particular, network-enabled devices are continually buffering information and scanning this information for transients, anomalies, deviations from normal functionality in what is being measured and the like. When one of these devices detects such an event, the device experiencing the event stores information associated with the event so as to allow a cause of the event to be determined. However, other devices on the network may also have information that may be pertinent to the event. Thus, some embodiments of the present invention provide a triggering mechanism for one device through a set of other devices, such as peer devices, such that information that would have been disregarded by the other devices can be retained and tagged correlating to the source device of the event.

Some embodiments of the present invention are directed to syncopated information capture based upon a remote device. For example, in a network of devices, for example meters, feeder protectors, software programs, uninterruptible power supplies (UPSs) and the like, any one of multiple devices can detect an "event." As used herein, "event" refers to detected deviation from normal functionality, an anomaly. These events may be mostly localized to the area of the triggering device, i.e., the device detecting the event. However for a more holistic view of the anomaly, devices that otherwise may not have detected an abnormal event, may have recorded information that ultimately is important. Thus, according to some embodiments of the present invention when a triggering event is detected at the triggering network enabled device, a message is transmitted to at least one other network-enabled device responsive to the detected triggering event. The message includes an indication of a time period associated with the triggering event and a request that the at least one other network-enabled device mark information associated with the at least one other network-enabled device during the associated time period as having significance such that the marked information will not be discarded by the at least one other network enabled device. Accordingly, the information marked and retained at the at least one other network-enabled device may be used to determine a cause of the triggering event as will be discussed further below with respect to FIGS. 1 through 6.

Figure 1:
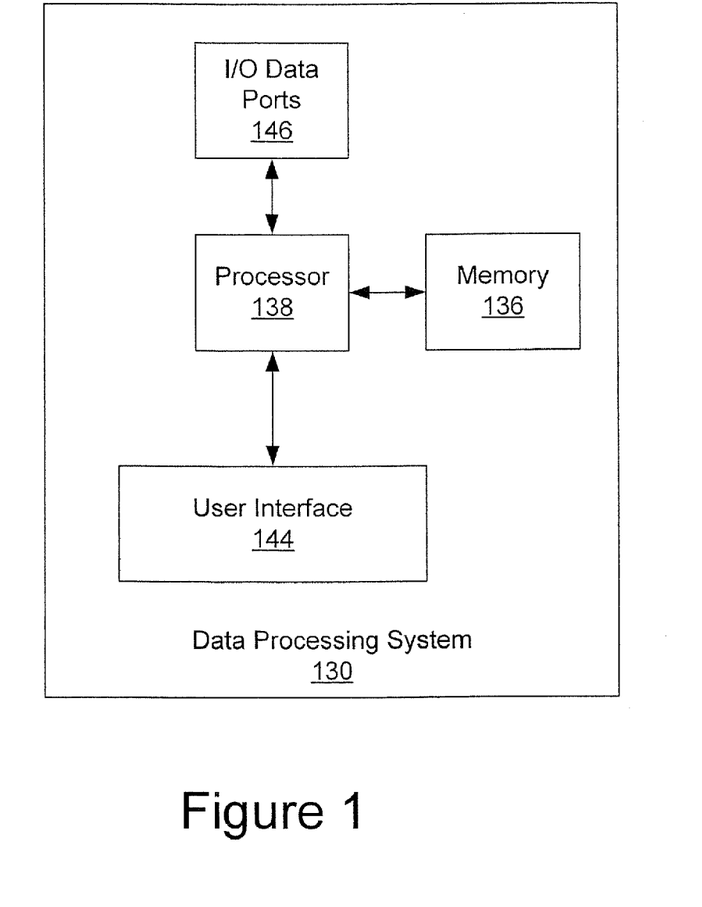
FIG. 1 is a block diagram of a data processing system suitable for use in some embodiments of the present invention.

Referring first to FIG. 1, an exemplary embodiment of a data processing system 130 configured in accordance with embodiments of the present invention will be discussed. The data processing system 130, which may be incorporated in a network-enabled device, such as a personal computer, server, power supply, a UPS or the like, may include a user interface 144, for example, input or output device(s), such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using an Internet protocol (IP) connection. These components may be conventional components such as those used in many conventional data processing systems, which may be configured to operate as described herein.

Figure 2:
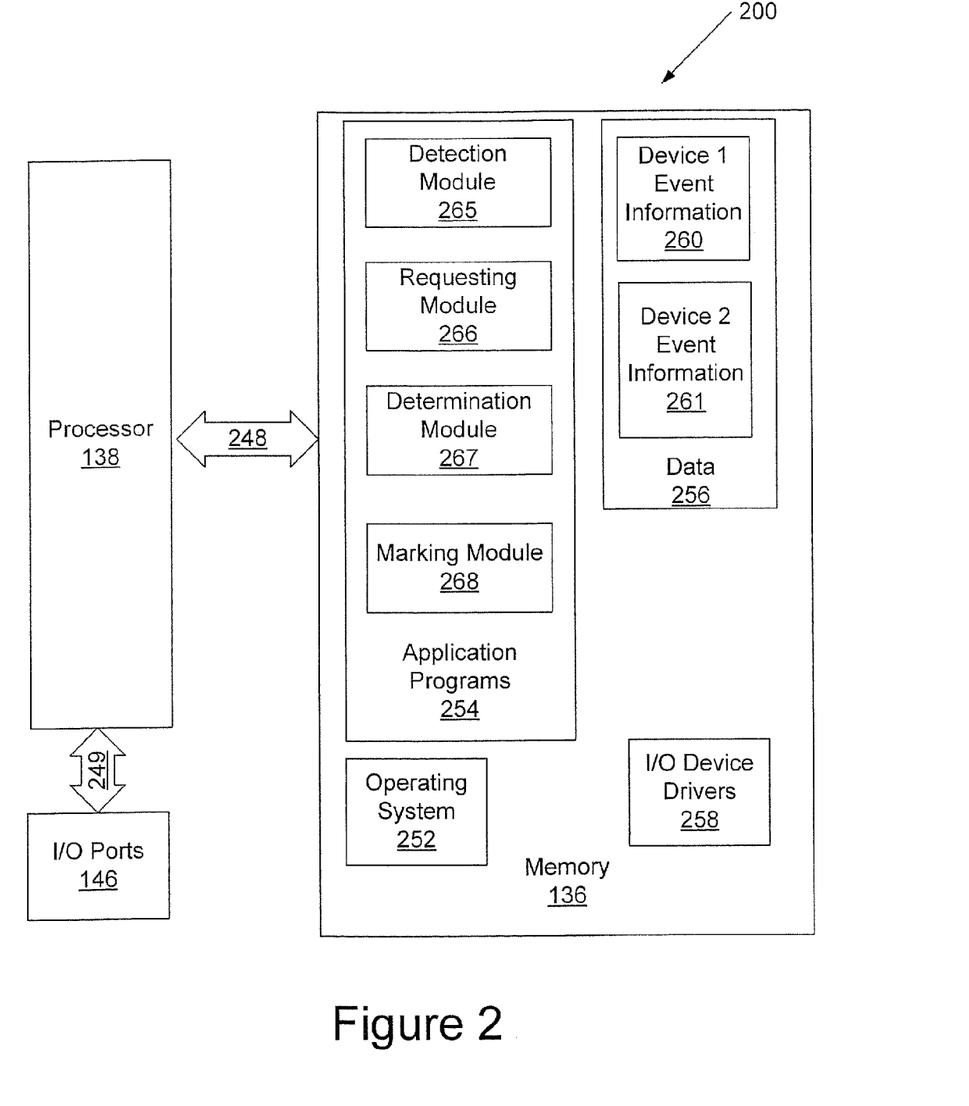
FIG. 2 is a block diagram of a system including a network-enabled device according to further embodiments of the present invention.

Referring now to FIG. 2, a more detailed block diagram of data processing system 200 of FIG. 1 according to some embodiments of the present invention will be discussed. The processor 138 communicates with the memory 136 via an address/data bus 248. The processor 138 can be any commercially available or custom microprocessor, microcontroller, digital signal processor or the like. The memory 136 may include any memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the status information module 268: an operating system or kernel 252; application programs 254; input/output (I/O) device drivers 258; and data 256. As will be appreciated by those of skill in the art, the operating system 252 may be any operating system suitable for use with a data processing system or embedded device, such as OS/2, AIX or zOS from International Business Machines Corporation, Armonk, N.Y., Windows95, Windows98, Windows2000 or WindowsXP from Microsoft Corporation, Redmond, Wash., Unix, Linux, embedded Linux, embedded XP, QNX or VxWorks. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 200 and preferably include at least one application that supports operations according to some embodiments of the present invention. Finally, the data 256 represents the static and dynamic data used by the application programs 254, the operating system 252, the I/O device drivers 258, and other software programs that may reside in the memory 136.

As illustrated in FIG. 2, the data 256 includes device 1 event information 260 and device 2 event information 261 according to some embodiments of the present invention. It will be understood that although only two device information files 260 and 261 are illustrated in FIG. 2, embodiments of the present invention are not limited to this configuration. For example, one or more than two information files may be present without departing from the scope of the present invention.

As further illustrated in FIG. 2, according to some embodiments of the present invention the application programs 254 include a detection module 265, a requesting module 266, a determination module 267 and a marking module 268. While the present invention is illustrated with reference to the detection module 265, the requesting module 266, the determination module 267 and the marking module 268 being application programs in FIG. 2, as will be appreciated by those of skill in the art, other configurations fall within the scope of the present invention. For example, rather than being application programs, the detection module 265, the requesting module 266, the determination module 267 and the marking module 268 may also be incorporated into the operating system 252 or other such logical division of the data processing system 130. Furthermore, while the detection module 265, the requesting module 266, the determination module 267 and/or the marking module 268 are illustrated in a single data processing system, as will be appreciated by those of skill in the art, such functionality may be distributed across one or more data processing systems. Thus, the present invention should not be construed as limited to the configuration illustrated in FIGS. 1 through 2, but may be provided by other arrangements and/or divisions of function between data processing systems.

Referring again to FIG. 2, in some embodiments of the present invention, the detection module 265 may be configured to detect a triggering event. As discussed above, the triggering event may be a detected deviation from normal functionality. Responsive to detection of a triggering event, the requesting module 266 may be configured to transmit a message to at least one other network-enabled device responsive to the detected triggering event. The message may be broadcast to all other network-enabled devices or to a select group of network-enabled devices. The message may include, among other things, an indication of time period associated with the triggering event and a request that the at least one other network-enabled device mark information associated with the at least one other network-enabled device during the associated time period as having significance.

As used herein, an indication of a time period refers to timing signal indicating the time period associated with the triggering event. As will be understood, representing time in accordance with some embodiments of the present invention can be done any number of ways without departing from the scope of the present invention. For example, time could be implemented as a fixed number of milliseconds from an epoch. Furthermore, an indication of a time period in accordance with some embodiments of the present invention may be a nearest second at which the triggering event occurred at the first network-enabled device and a number of microseconds from the nearest second at which the triggering event occurred.

It will be understood that the data processing system 200 of FIG. 2 may be included in both the device experiencing the triggering event and the other devices receiving the message responsive to detection of the triggering event without departing from the scope of the present invention. It will be further understood that the event may be detected by more than one device, thus more than one device may experience the triggering event. Devices according to some embodiments of the present invention may be, for example, uninterruptible power supplies (UPSs), electricity meters, software program, feeder protectors, network attached storage or any network-enabled device without departing from the scope of the present invention.

The determination module 267 may be configured to receive the message and determine if the network-enabled device has information that pertains to the time period indicated therein. The marking module 268 may be configured to mark the information pertaining to the time period at the network-enabled device as having significance in the data files (buffers), for example, device 1 event information 260 or device 2 event information 261, if determined to be present. Thus, the marking module 268 is configured to mark information associated with the time period, if the information is present this may cause information that would have been discarded to be retained. The marked information may include, for example, monitoring parameters and/or telemetry data physically or logically associated with the at least one other network-enabled device during the time period in the message. In some embodiments of the present invention, the marking module 268 may be further configured to mark an associated tag indicating an identity of the network-enabled device.

Figure 3:
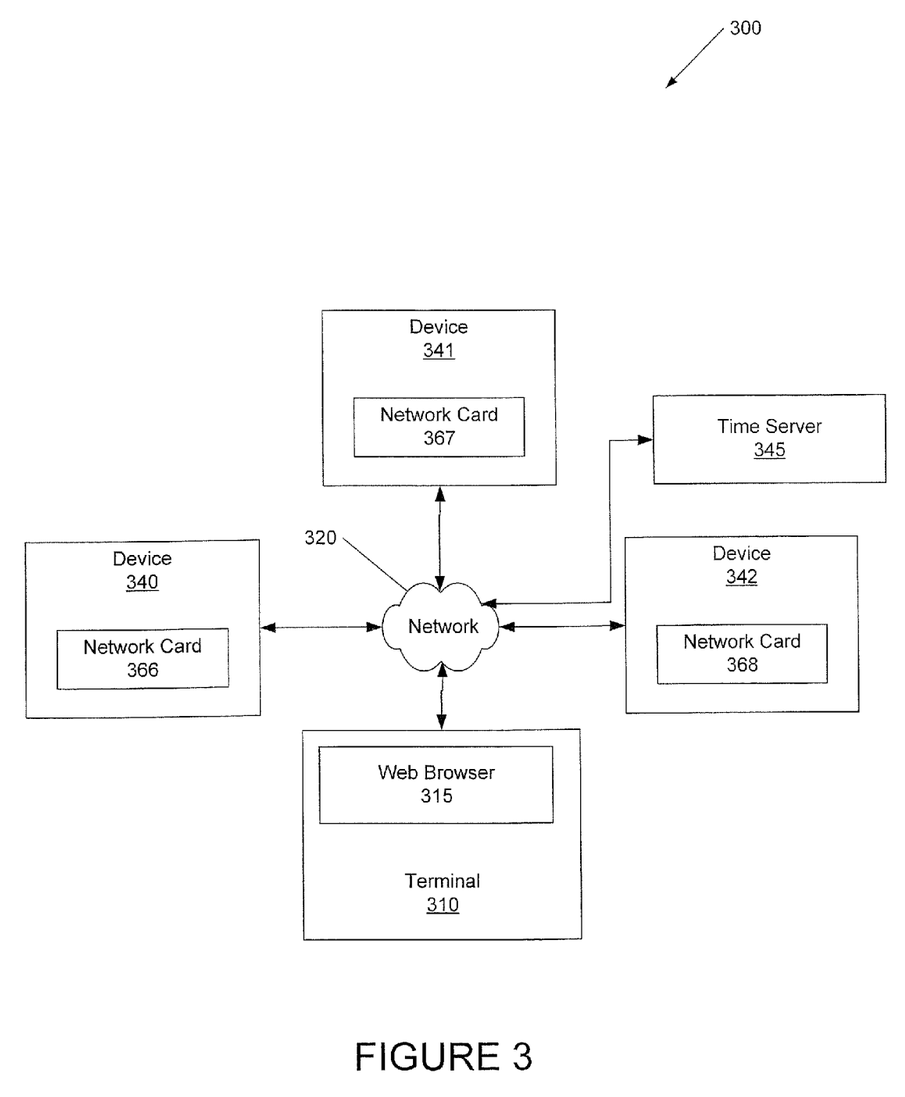
FIG. 3 is a block diagram illustrating still further embodiments of the present invention in an exemplary network environment.

FIG. 3 illustrates a network environment 300 according to some embodiments of the present invention. As illustrated in FIG. 3, the network environment 300 may include a terminal 310, a network 320, one or more network-enabled devices 340, 341 and 342, for example, uninterruptible power supplies (UPSs), switches, routers, meters and the like, and a time server 345. The terminal 310 may be, for example, a laptop computer, a desktop computer, a personal data assistant (PDA), a web capable mobile terminal or any device capable of communicating with the network 320. As illustrated, the terminal 310 may be configured to run a web browser 315, which may be used by, for example, a system administrator to monitor remote devices 340, 341 and 342. The terminal 310 may communicate over the network 320, for example, the internet, through a telephone line, a digital subscriber link (DSL), a broadband cable link, a wireless link or the like, with the one or more network-enabled devices 340, 341 and 342.

As further illustrated, the network-enabled devices 340, 341 and 342 may include network cards 366, 367 and 368 that communicate with the network 320. In some embodiments of the present invention, the network cards 366, 367 and 368 may be ConnectUPS Web/SNMP Card offered by Eaton Power Quality Corporation, the assignee of the present application. The ConnectUPS Web/SNMP Card is configured to install in a device to provide simple network management protocol (SNMP), hypertext transfer protocol (HTTP), simple mail transfer protocol (SMTP), wireless application protocol (WAP) and Telnet compatibility and advanced RS-232 communications. The network card may allow monitoring and management of devices, for example, servers, routers, hubs, UPSs and other key inter-networking devices. ConnectUPS Web/SNMP cards provide a link between the device and, for example, the Ethernet local area/wide area network (LAN/WAN), allowing the device to be remotely monitored and controlled.

The time server 345 may be configured to synchronize the device clocks to a synchronized time in accordance with some embodiments of the present invention.

Exemplary operations according to some embodiments of the present invention will now be discussed with respect to FIGS. 2 and 3. A triggering device 340, for example, a meter, on both an electrical circuit and a communications network, such as a local area network (LAN), may detect a triggering event, for example, a power circuit anomaly. Assuming that the date and time of devices 340, 341, and 342 are tightly time-coordinated, for example, within 1.0 ms), as in Power Xpert Architecture network offered by Eaton Power Quality Corporation, the triggering device 340 transmits a message to other devices 341 and 342 on the LAN that a triggering event has occurred. As discussed above, the message may be sent to a select group of devices or may be broadcast a local segment without departing from the scope of the present invention. As further discussed above, the message includes an indication of a time period associated with the triggering event, for example, the nearest second to when the event occurred and the number of microseconds from that second that the event occurred to the best accuracy of the device 340.

Upon reception of the message at the other devices 341 and 342, the other devices 341 and 342 each determine if it has information within its buffers that pertain to the time stamp indicated by the message. If it is determined that the device 341 and 342 has this information, the information may be marked as having significance and retained rather than discarded. The marked information may also be tagged relative to the requesting device 340.

Thus, according to some embodiments of the present invention, a device experiencing an event may message other devices to cause a response in one or more remote devices into retaining monitoring parameters and telemetry around the time period requested from the triggering device. As will be understood, a communications network where all devices can share communications is assumed. Furthermore, the device on the communications network should be capable of capturing and buffering data. The communication between devices should be fast enough to enable embodiments of the present invention and should be time synchronized.

In some embodiments of the present invention, once the triggering device detects a triggering event, the triggering device may initiate either a broadcast or specifically addressed messaging sequence to remote devices via the attached networks messaging mechanism. In some embodiments of the present invention, the address of the triggering device is assumed available in the wrapper to the message data. Content and order of an exemplary sympathetic notification message are set out below.

[Event Epoch Seconds] [Event uSeconds Fraction] [Event Type|Priority] [Initiator Device Type]

The Event Epoch Seconds may be 4-bytes (32 bits) long. These 4 bytes may contain a representation of the number of seconds that have occurred since the epoch. In some embodiments of the present invention, the epoch is considered as the point in time of 00:00 UTC Jan. 1, 1970 excluding leap seconds. One day's advance is 86400 regardless of leap seconds.

The Event uSeconds Fraction is also 4 bytes (32 bits) line. These 4 bytes may contain a representation of the number of microseconds that have elapsed since the start of Event Epoch Seconds indicating the initiation of the triggering event in question.

The Event Type|Priority is one byte (8 bits) long. These 8 bits maybe divided into upper 4 bits for Event Type and lower 4 bits for Priority. The Initiator Device (triggering device) Type is 1 byte (8 bits) long. This 8 bits byte may categorize the type of the triggering device initiating the request.

In some embodiments of the present invention, devices 340, 341 and 342 capable of capturing electrical waveform data, for example between Power Xpert 8000 meters, it may be possible for a facility-wide sympathetic waveform capture at the time of an event as discussed in detail herein.

Figure 4:
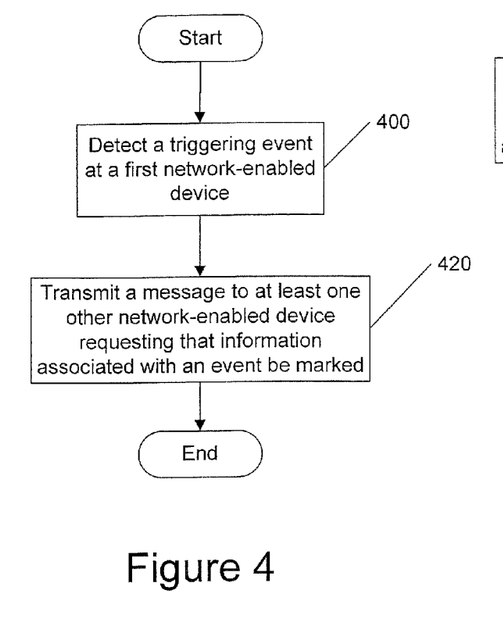
FIGS. 4 through 6 are flowcharts illustrating exemplary operations of devices according to various embodiments of the present invention.

Operations for capturing information associated with a triggering event at a network-enabled device will now be discussed further with respect to the flowcharts of FIGS. 4 through 6. Referring now to FIG. 4, operations begin at block 400 by detecting a triggering event at a first network-enabled device. For example, the first network-enabled device may detect an anomaly or deviation from the norm. The first network-enabled device transmits a message to one or more other network-enabled devices responsive to the detected triggering event (block 420). As discussed above, the message includes an indication of a time period associated with the triggering event and a request that the one or more other network-enabled devices mark information associated with the one or more other network-enabled devices during the associated time period as having significance such that the marked information may be retained rather than discarded.

Figure 5:
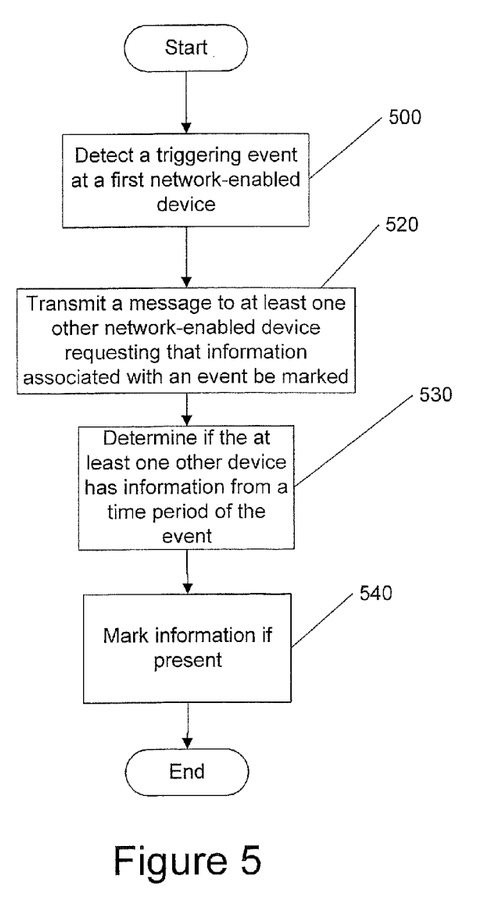

Referring now to FIG. 5, operations begin at block 500 by detecting a triggering event at a first network-enabled device. For example, the first network-enabled device may detect a deviation from normal functionality. The first network-enabled device transmits a message to one or more other network-enabled devices responsive to the detected triggering event (block 520). The message may be broadcast to all other network-enabled devices or transmitted to a select group of network-enabled devices without departing from the scope of the present invention.

As discussed above, the message includes an indication of a time period associated with the triggering event and a request that the one or more other network-enabled devices mark information associated with the one or more other network-enabled devices during the associated time period as having significance. In some embodiments of the present invention indication of a time period may include a timing signal indicating the time period associated with the triggering event. For example, a nearest second at which the triggering event occurred at the first network-enabled device and a number of microseconds from the nearest second at which the triggering event occurred.

It may be determined at the one or more other network-enabled devices if the one or more other network-enabled devices has information that pertains to the time period (block 530). If it is determined that the one or more other network-enabled devices has this information, the information pertaining to the time period at the one or more other network-enabled devices may be marked as having significance (block 540). In some embodiments of the present invention, the information may be marked with an associated tag indicating an identity of the first network-enabled device. The information marked at the one or more other network-enabled devices may include monitoring parameters and/or telemetry data physically or logically associated with the one or more other network-enabled devices during the time period in the message.

Figure 6:
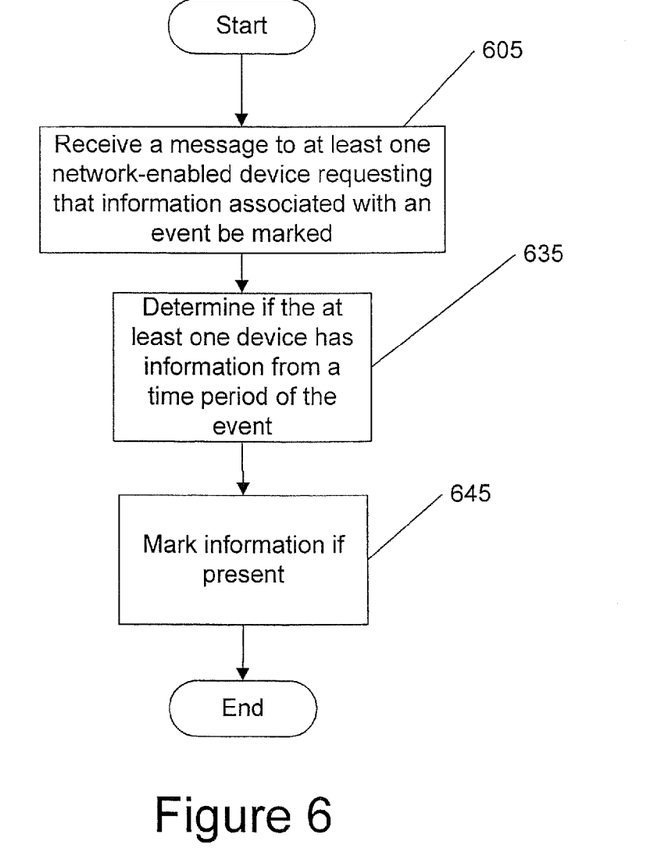

Referring now to FIG. 6, operations for capturing information associated with a triggering event at a network-enabled device according to some embodiments of the present invention will be discussed. A message is received at one or more network-enabled devices from a requesting device (block 605). The message includes an indication of a time period associated with a triggering event and a request that the one or more network-enabled devices mark information associated with the one or more network-enabled devices during the associated time period as having significance. The time period in the message may include a nearest second at which the triggering event occurred at the requesting network-enabled device and a number of microseconds from the nearest second at which the triggering event occurred. It is determined at the one or more network-enabled devices if the one or more network-enabled devices has information that pertains to the time period (block 635). If it is determined that the one or more network enabled devices has this information, the information pertaining to the time period at the one or more network-enabled devices is marked as having significance (block 645). In some embodiments of the present invention, the information may be marked with an associated tag indicating an identity of the requesting network-enabled device. The information marked at the one or more network-enabled devices may include monitoring parameters and/or telemetry data physically or logically associated with the at least one network-enabled device during the time period in the message.

As discussed briefly above with respect to FIGS. 1 through 6, according to some embodiments of the present invention, when a triggering device detects an abnormal or triggering event, the triggering device may initiate either a broadcast or specifically addressed messaging sequence to one or more other devices via the attached networks messaging mechanism. The messaging of the triggering device to the other devices may cause a response in one or more of the other devices to retain monitoring parameters and telemetry around the time interval requested from the initiating device. As discussed above, this marked information may be useful in detecting the cause of the anomaly.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method for capturing information associated with a triggering event at a network-enabled device, the method comprising:

detecting a triggering event at a first network-enabled device;

transmitting a message to at least one other network-enabled device responsive to the detected triggering event, the message including an indication of a time period associated with the triggering event and a request that the at least one other network-enabled device mark information associated with the at least one other network-enabled device during the associated time period as having significance; and marking the information with a tag indicating an identity of the first network-enabled device, wherein the at least one other network-enabled device has a different device type from the first network-enabled device.

2. The method of claim 1, wherein the indication of a time period comprises a timing signal indicating the time period associated with the triggering event.

3. The method of claim 2, wherein the timing signal comprises a nearest second at which the triggering event occurred at the first network-enabled device and a number of microseconds from the nearest second at which the triggering event occurred.

4. The method of claim 2, further comprising:

determining at the at least one other network-enabled device if the at least one other network-enabled device has information that pertains to the time period; and marking the information pertaining to the time period at the at least one other network-enabled device as having significance if determined to be present such that the information will not be discarded at the at least one other network enabled device.

5. The method of claim 1, wherein transmitting comprises broadcasting the message to all other network-enabled devices or transmitting the message to a select group of network-enabled devices.

6. The method of claim 1, wherein the information marked at the at least one other network-enabled device comprises monitoring at least one of parameters and telemetry data associated with the at least one other network-enabled device during the time period in the message.

7. The method of claim 1, wherein the triggering event comprises a detected deviation from normal functionality.

8. A method for capturing information associated with a triggering event at a network-enabled device, the method comprising:

receiving a message at at least one network-enabled device from a requesting device, the message including an indication of a time period associated with a triggering event and a request that the at least one network-enabled device mark information associated with the at least one network-enabled device during the associated time period as having significance;

determining at the at least one network-enabled device if the at least one network-enabled device has information that pertains to the time period;

marking the information pertaining to the time period at the at least one network-enabled device as having a significance if determined to be present such that the information will not be discarded at the at least one network enabled device; and marking the information with an associated tag indicating an identity of the requesting network-enabled device, wherein the at least one other network-enabled device has a different device type from the requesting device.

9. The method of claim 8, wherein the indication of a time period comprises a timing signal indicating the time period associated with the triggering event.

10. The method of claim 9, wherein the timing signal comprises a nearest second at which the triggering event occurred and a number of microseconds from the nearest second at which the triggering event occurred.

11. The method of claim 9, wherein the marked information at the at least one network-enabled device comprises monitoring parameters and/or telemetry data associated with the at least one network-enabled device during the time period in the message.

12. A network-enabled device configured to capture information associated with a triggering event, the device comprising:
   a detection module configured to detect a triggering event; and
   a requesting module configured to transmit a message to at least one other network-enabled device responsive to the detected triggering event, the message including an indication of a time period associated with the triggering event and a request that the at least one other network-enabled device mark information associated with the at least one other network-enabled device during the associated time period as having significance,
   wherein the at least one other network-enabled device has a different device type from the network-enabled device, and wherein marking the information comprises marking the information with an associated tag indicating an identity of the network-enabled device.

13. The device of claim 12, wherein the indication of a time period comprises a timing signal indicating the time period associated with the triggering event.

14. The device of claim 13, wherein the timing signal comprises a nearest second at which the triggering event occurred and a number of microseconds from the nearest second at which the triggering event occurred.

15. The device of claim 13, further comprising:
   a determination module configured to receive the message and determine if the network-enabled device has information that pertains to the time period; and
   a marking module configured to mark the information pertaining to the time period at the network-enabled device if determined to be present such that the marked information is not discarded at the network enabled device.

16. The device of claim 15, wherein the marking module is further configured to store the associated tag indicating the identity of the network-enabled device.

17. The device of claim 12,
   wherein the device comprises one of an uninterruptible power supply (UPS), electricity meter, feeder protector, or network attached storage, and
   wherein the at least one other network-enabled device comprises a different one of the UPS, the electricity meter, the feeder protector, or the network attached storage.

18. A computer program product for capturing information associated with a triggering event at a network-enabled device, the computer program product comprising:
   non-transitory computer readable storage medium having computer readable program code embodied in said medium, the computer readable program code comprising:
      computer readable program code configured to detect a triggering event at a first network-enabled device;
      computer readable program code configured to transmit a message to at least one other network-enabled device responsive to the detected triggering event, the message including an indication of a time period associated with the triggering event and a request that the at least one other network-enabled device mark information associated with the at least one other network-enabled device during the associated time period as having significance; and
      computer readable program code configured to mark the information with an associated tag indicating an identity of the first network-enabled device,
   wherein the at least one other network-enabled device has a different device type from the first network-enabled device.

19. The computer program product of claim 18, wherein the indication of a time period comprises a timing signal indicating the time period associated with the triggering event.

20. The computer program product of claim 19, wherein the timing signal comprises a nearest second at which the triggering event occurred at the first network-enabled device and a number of microseconds from the nearest second at which the triggering event occurred.

21. The computer program product of claim 19, further comprising:
   computer readable program code configured to determine at the at least one other network-enabled device if the at least one other network-enabled device has information that pertains to the time period; and
   computer readable program code configures to mark the information pertaining to the time period at the at least one other network-enabled device as having significance if determined to be present such that the marked information is not discarded.

22. A computer program product for capturing information associated with a triggering event at a network-enabled device, the computer program product comprising:
   non-transitory computer readable storage medium having computer readable program code embodied in said medium, the computer readable program code comprising:
      computer readable program code configured to receive a message at at least one network-enabled device from a requesting device, the message including an indication of a time period associated with a triggering event and a request that the at least one network-enabled device mark information associated with the at least one network-enabled device during the associated time period;
      computer readable program code configured to determine at the at least one network-enabled device if the at least one network-enabled device has information that pertains to the time period;
      computer readable program code configured to mark the information pertaining to the time period at the at least one network-enabled device if determined to be present; and
      computer readable program code configured to mark the information with a tag indicating an identity of the requesting device,
   wherein the at least one network-enabled device has a different device type from the requesting device.

* * * * *